(12) United States Patent
Saptharishi

(10) Patent No.: US 7,925,653 B2
(45) Date of Patent: Apr. 12, 2011

(54) METHOD AND SYSTEM FOR ACCESSING A GROUP OF OBJECTS IN AN ELECTRONIC DOCUMENT

(75) Inventor: Ramkumar Saptharishi, Bangalore (IN)

(73) Assignee: General Electric Company, Schenectady, NY (US)

( * ) Notice: Subject to any disclaimer, the term of this patent is extended or adjusted under 35 U.S.C. 154(b) by 466 days.

(21) Appl. No.: 12/038,475

(22) Filed: Feb. 27, 2008

(65) Prior Publication Data

US 2009/0216794 A1   Aug. 27, 2009

(51) Int. Cl.
*G06F 7/00* (2006.01)
*G06F 17/30* (2006.01)

(52) U.S. Cl. .................... 707/737; 707/915; 715/206
(58) Field of Classification Search .............. 707/737, 707/915; 715/206
See application file for complete search history.

(56) References Cited

U.S. PATENT DOCUMENTS

| | | | |
|---|---|---|---|
| 5,426,684 A | | 6/1995 | Gaborski et al. |
| 5,544,256 A | * | 8/1996 | Brecher et al. ............. 382/149 |
| 5,731,814 A | * | 3/1998 | Bala ............................. 715/848 |
| 5,774,119 A | * | 6/1998 | Alimpich et al. ............ 715/764 |
| 5,801,699 A | * | 9/1998 | Hocker et al. ............... 715/837 |
| 6,870,549 B1 | * | 3/2005 | Swann et al. ................. 345/636 |
| 7,139,432 B2 | | 11/2006 | Wenzel et al. |
| 7,401,338 B1 | * | 7/2008 | Bowen et al. ................. 719/328 |
| 2003/0095692 A1 | * | 5/2003 | Mundy et al. ................. 382/128 |
| 2003/0179236 A1 | * | 9/2003 | Good et al. .................... 345/764 |
| 2004/0066384 A1 | * | 4/2004 | Ohba ............................ 345/419 |
| 2004/0117164 A1 | * | 6/2004 | Elling et al. ..................... 703/11 |
| 2004/0143598 A1 | * | 7/2004 | Drucker et al. ........... 707/104.1 |
| 2006/0008151 A1 | | 1/2006 | Lin et al. |
| 2006/0045370 A1 | | 3/2006 | Blaffert et al. |
| 2007/0098239 A1 | | 5/2007 | Zhou et al. |
| 2007/0110301 A1 | * | 5/2007 | Wu et al. ....................... 382/162 |
| 2007/0176944 A1 | | 8/2007 | Brown et al. |
| 2010/0014730 A1 | * | 1/2010 | Hahn et al. .................... 382/131 |

\* cited by examiner

*Primary Examiner* — Jean B. Fleurantin
*Assistant Examiner* — Phong Nguyen
(74) *Attorney, Agent, or Firm* — Hanley, Flight & Zimmerman, LLC

(57) ABSTRACT

A method and system for accessing a group of objects in an electronic document is disclosed herein. The method comprises: selecting at least one object from an electronic document and grouping a plurality of objects in the electronic document based on characteristics of the selected object. The method further comprises: accessing a group of objects upon focusing on at least one of the grouped objects.

13 Claims, 7 Drawing Sheets

METHOD AND SYSTEM FOR ACCESSING A GROUP OF OBJECTS IN AN ELECTRONIC DOCUMENT

FIELD OF THE INVENTION

This invention relates generally to display methods, and more particularly to, a method and system for accessing a group of objects in a displayed electronic document.

BACKGROUND OF THE INVENTION

Accessing a group of objects can be a cumbersome process, as it requires coordination among the objects. Conventionally the objects in a group are identified manually and are accessed manually. There exist some techniques to group a set of objects automatically. However to access the group, the user has to access the group manually. It is time consuming and the efficiency of the process is subject to the skills of the user. In an example, for displaying a set of objects in an image, the user may need to identify various objects and then select an option to display or highlight the group.

Analysis of images and documents are very important in diagnosis and data management systems. To analyze an image or document, it can be essential to visually highlight, bookmark and annotate similar or correlated objects in the image or document. At present, the workflow for the same is manual and time consuming. For example, in the case of analyzing a medical image, it is often essential to identify various objects such as fat deposits or calcium deposits in the image accurately. Many times the physician or radiologist will need to identify each object separately. This identification is subject to errors as the physician may miss identifying one or more similar objects in the image.

There exist some techniques to identify similar objects in an image or document and group them together. However, the visual appearance of the same is not user friendly and the group is not quickly accessible to the user. For example, in medical images, intravascular calcium objects are identified automatically upon identifying one calcium object by the physician. However the accessibility of the group is cumbersome, especially when a large number of images need to be grouped and displayed. It will be beneficial to have a method to access or display the grouped images quickly and easily.

Thus there exists a need to provide a method and system for automating the process of accessing a group of objects in an electronic document.

SUMMARY OF THE INVENTION

The above-mentioned shortcomings, disadvantages and problems are addressed herein which will be understood by reading and understanding the following specification.

One embodiment of the present invention provides a method of displaying an electronic document. The method includes: selecting at least one object from an electronic document; grouping a plurality of objects in the electronic document based on characteristics of the selected object; and accessing the group of objects upon focusing on at least one of the grouped objects.

In another embodiment, a method of highlighting similar objects in a medical image is provided. The method includes: selecting at least one object in a medical image; automatically identifying similar objects present in the image based on at least clinical characteristics of the selected object; grouping the identified similar objects as a group; focusing on an object in the group; and highlighting the objects in the group corresponding to the focused object. In an example, the selected object is focused for highlighting the group of objects.

In yet another embodiment, a system for displaying an electronic document is disclosed. The system includes: a display configured to display an electronic document; an interface configured to assist in selecting an object in the displayed electronic document; and a processor configured to group the objects in the electronic document based on the characteristics of the selected object. The system is further configured to highlight the objects in a group upon focusing on one object in the group using the interface.

In yet another embodiment, a computer-readable media having one or more computer readable medium for displaying an object is disclosed. The media includes: a routine for grouping objects in an electronic document based on characteristics of a selected object; and a routine for accessing the group of objects by focusing on an object in the group.

In yet another embodiment, a clinical system is disclosed. The system includes: a medical equipment configured to capture medical images; a processor associated with the medical equipment configured to automatically group a plurality of objects in a medical image based on their characteristics; a user interface configured to select a group by focusing on an object in the group; and a display for visually highlighting the group of objects having similar characteristics.

Various other features, objects, and advantages of the invention will be made apparent to those skilled in the art from the accompanying drawings and detailed description thereof.

DETAILED DESCRIPTION OF THE INVENTION

Figure 1:
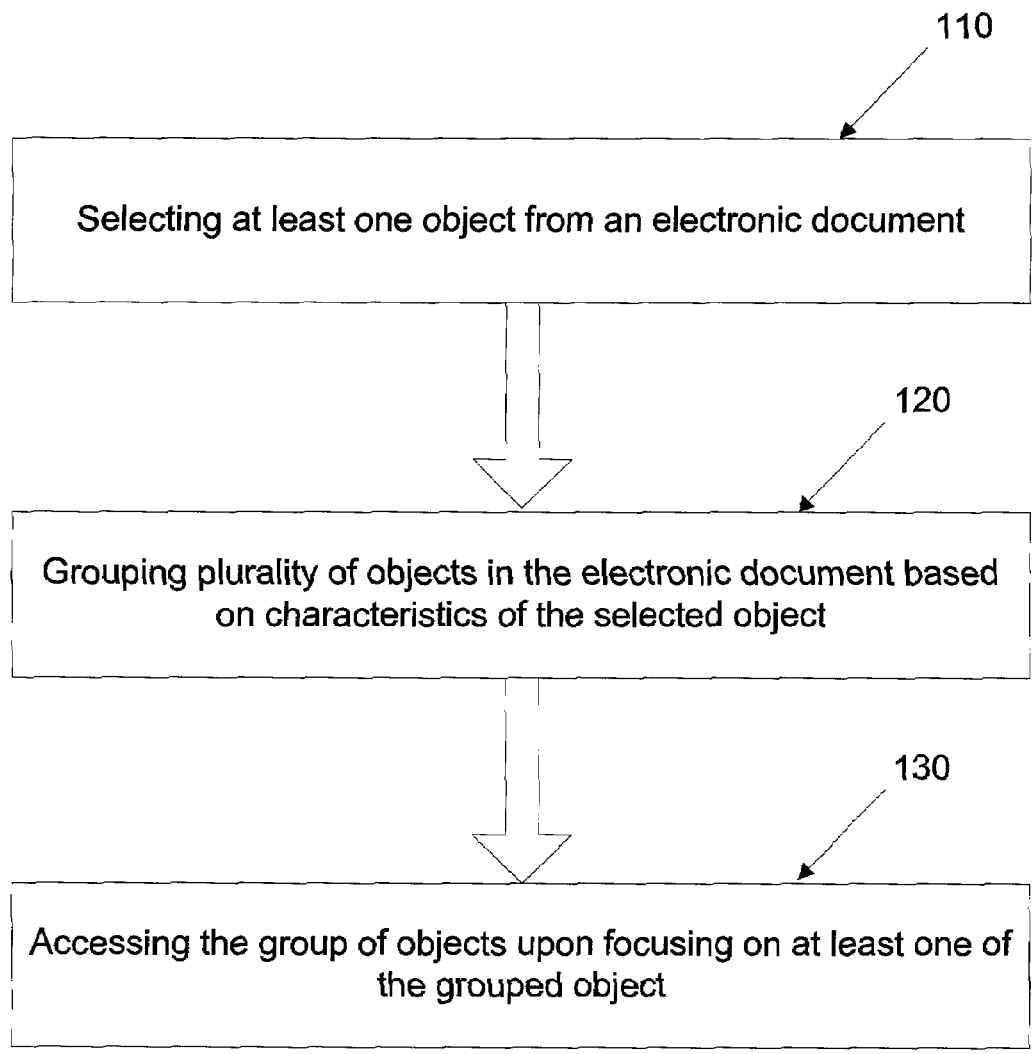
FIG. 1 is a flowchart illustrating an electronic-document display method as described in an embodiment of the invention.

In the following detailed description, reference is made to the accompanying drawings that form a part hereof, and in which is shown by way of illustration specific embodiments that may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken as limiting the scope of the invention.

Various embodiments of the present invention are directed to accessing a group of objects based on characteristics of a selected object in an electronic document. The group of objects are accessed upon focusing on any of the object in the group. In an exemplary embodiment, a group of objects is identified and highlighted upon focusing on an object in the group.

In an embodiment, the invention facilitates automatically identifying and grouping objects having similar characteristics in an electronic document including image, text document, menus, files, tables, chart objects, picture objects, drawings, etc. or any other software program such as an electronic mail program, a calendaring or scheduling program or an Internet browsing program. The images can be grouped in any plane including extension of planes. The grouped objects in the electronic document can be accessed using a one-touch workflow.

In an exemplary embodiment, grouping and highlighting of various objects in a medical image is disclosed. The various objects in a medical image may include Intra or inter calcium or fatty deposition, tumor, metastatic spread of same cancer growth, blood vessel blocks, etc., but the examples of the objects need not be limited to these. The medical image may include an image obtained from any high-resolution medical imaging device.

In an embodiment, the invention provides a system for visually highlighting similar objects in an electronic document displayed on a visual interface, upon focusing on an object in the electronic document.

In an embodiment, a method of grouping of images taken in various planes is disclosed. In case of medical images, the method provides highlighting the presence of corresponding objects or extension of the objects in orthogonal planes, even if the focus is on any one of the grouped objects in one of the other planes including axial, saggital or coronal plane.

In an embodiment, an improved document display workflow is suggested. The workflow includes grouping various objects in a menu based on the functionality of the objects, grouping various objects in a document based on the visual similarity of the objects, grouping various objects in a medical image based on the clinical properties of the object, grouping various objects in a file based on their properties, etc. The grouped objects are highlighted on a display upon focusing on an object in the group. The views of corresponding objects from different planes are grouped and displayed, even when the focus is on an object in one plane.

The term "object" referred in the specification need not refer to one parameter, but may include a plurality of parameters unless otherwise specified. Similarly, the term "medical image" refers to an image taken by any medical imaging device.

Though the example illustrated in the specification mainly deals with images, the application of the invention need not be limited to this. The invention is applicable to any electronic document as mentioned above. Different embodiment may comprise many types of software applications or programs, such as an electronic mail program, a calendaring or scheduling program, an Internet browsing program, and the like. An example of such programs is the OUTLOOK electronic mail program manufactured by MICROSOFT CORPORATION. The method and system disclosed herein may be used with a number of other types of software applications including a multiple-functionality software application for providing many other types of functionalities. Such a multiple-functionality application may include a number of program modules, such as a word processing program, a spreadsheet program, a slide presentation program, a database program, and the like. An example of such a multiple-functionality application is the OFFICE application manufactured by MICROSOFT CORPORATION. Also the application of the invention may include grouping functionality of hardware components such as a printer, memory, etc. According to embodiments of the present invention, the application is operable to highlight a group of objects displayed on an electronic display screen, upon focusing on one object in the group.

FIG. 1 is a flowchart illustrating an electronic document display method as described in an embodiment of the invention. At step 110, at least one object from an electronic document is selected. The electronic document may be displayed on a display and a user may select a part of the document or an object in the document using any user interface. The electronic document may include an image, a text document, tables, drawings, menus, files, etc. or any other software program such as an electronic mail program, a calendaring or scheduling program or an Internet browsing program. In an embodiment, instead of selecting an object from a displayed electronic document, some of the unique characteristics or properties of a desired object in the document may be specified. At step 120, a plurality of objects in the electronic document is grouped based on the characteristics of the selected object. Once the object is selected, the characteristics of the selected object are identified. The characteristics of the selected object might include image characteristics, similarity of the text, properties of the file or functionality of objects in the menu. The characteristics could include any unique property of an object based on which similar objects in the electronic document need to be grouped. The objects having similar characteristics present in the electronic document are identified and are grouped together. This group may be saved in a memory. Also, the characteristics or the knowledge gained from the characteristics of the selected object may be saved, so that it can be used in the future.

For example, if an object in a menu is selected based on the functionality of the object, later grouping of the objects in the menu may be done by specifying the functionality of the object instead of selecting the object from the menu. In an exemplary embodiment, the electronic document may be an image and the object may be a region of interest of the image. Based on the characteristics of the object selected, the object present in different views of the image is grouped together, including the image viewed from different planes or angles. For example, if an object is selected in an image, the characteristics of the object are identified and the objects having similar characteristics in one plane and corresponding extension of objects in different planes are grouped together. The object from different planes can be grouped together based on their pixel or voxel characteristics. In other words, in case of an image, the selected object may be extended in different planes. If the selected object has dimensions specified in length, breadth and thickness, then the object viewed from different planes may be different and they need to be grouped separately, but related to each other. Alternately the selected object may be extended only in two-dimensional plane. However the image might have objects having characteristics similar to that of the selected object, but extending in the perpendicular direction as well. The objects available in different planes corresponding to the selected object are identified and are grouped together.

At step 130, the grouped objects are accessed upon focusing on at least one object in the group. If any of the objects present in the image is focused on using a user interface, all the objects in the group or the objects having similar characteristics are highlighted. Thus by focusing on an object, all the similar objects present in the electronic document are highlighted. In an example, if an object in an image in one plane is focused on, then the objects present in the image are grouped along with corresponding objects visible in different planes and angles. Thus upon focusing on an object in one plane, the objects available in the image in the same plane along with the corresponding extension of objects in different planes are highlighted. For example, if an image viewed in the axial plane is displayed, and an object is selected, then objects having similar characteristics in the same plane along with the extension of the objects in different planes are grouped and highlighted. The objects in different planes may be displayed separately or may be combined together to be displayed as a three-dimensional or two-dimensional object. The method could further include processing the group of objects simultaneously. Various processing techniques may include editing, annotating, masking, or similar image/document processing techniques.

In an example, the image may include two-dimensional, three-dimensional or moving images.

In an example, the object may be an appointment in a calendaring program wherein various meetings may be grouped and highlighted.

In an embodiment, multiple objects may be selected, each object having different characteristics. Based on the characteristics, the objects may be grouped into different groups and that may be highlighted simultaneously or individually.

Figure 2:
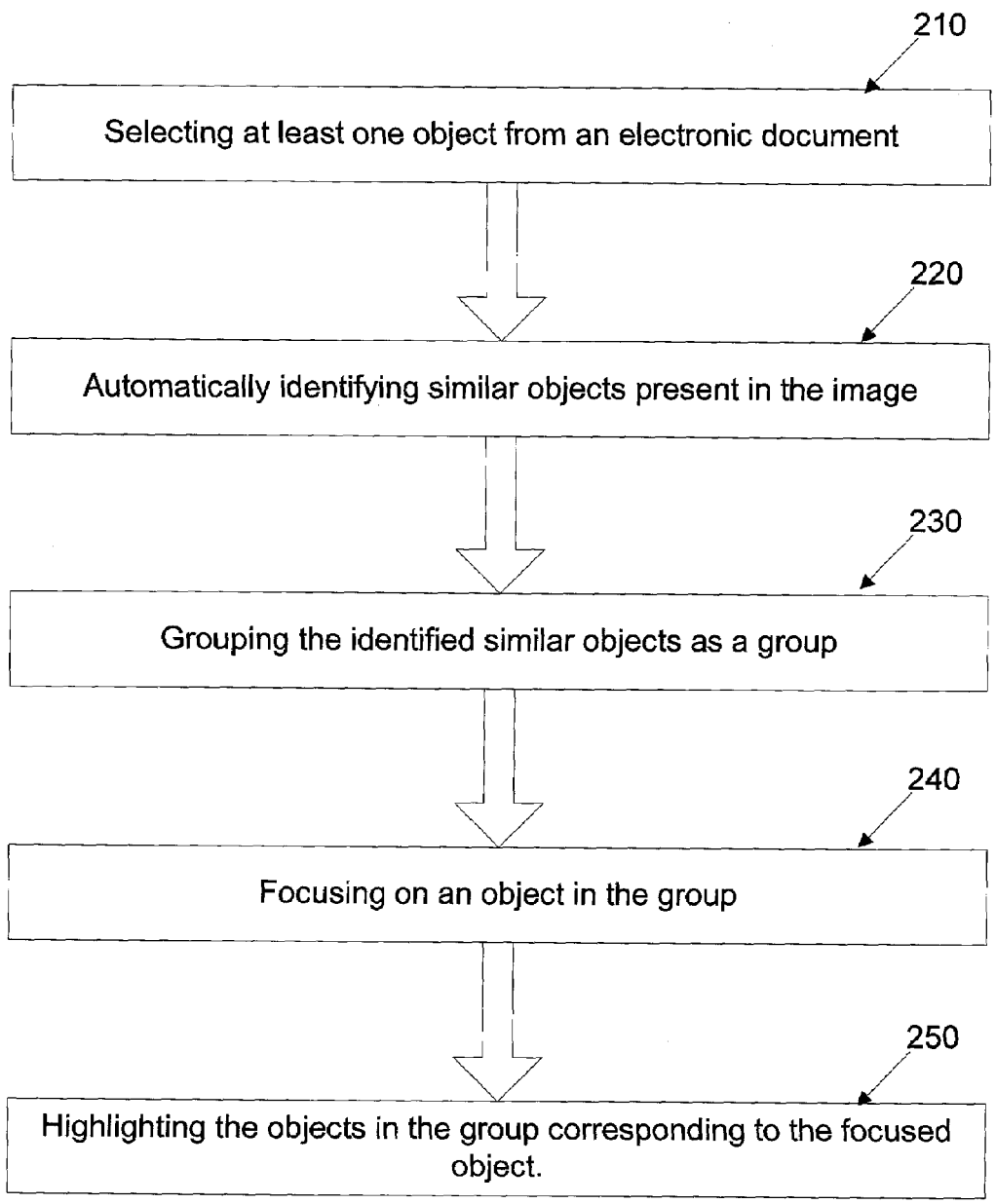
FIG. 2 is a flowchart illustrating a method of highlighting an object in a medical image as described in an exemplary embodiment of the invention.

FIG. 2 is a flowchart illustrating a method of highlighting an object in a medical image as described in an exemplary embodiment of the invention. An exemplary embodiment of the invention discloses a method of highlighting various calcium deposits in a medical image. The medical image might include any high resolution images captured using different imaging modalities such as MR, CT, X-Ray, Ultrasound, etc., but need not be limited to these examples. At step 210, an object from the medical image is selected. The object may include a region in the image displaying intravascular calcium deposit, inter-vascular calcium deposit, blood vessel blocks, tumor or cancer growth, etc., but the examples need not be limited to these. A physician or radiologist could identify the object in an image. Alternately some characteristics or properties of the object may be specified. In an example, the physician or radiologist may identify an intravascular calcium deposit.

At step 220, the objects having similar characteristics as that of the selected object are identified automatically. In an example, the clinical properties of the selected object are identified and objects present in the image having same clinical properties are identified. For example, if the physician selects a calcium deposit, the properties of the calcium deposit are identified and, based on the same, other calcium deposits present in the image are automatically identified.

At step 230, the identified objects are grouped. Grouping could be achieved in different forms and using different techniques. In an embodiment, objects appearing in one plane alone may be grouped. Alternately objects appearing in different planes may be grouped together or separately. For example, the calcium deposits present in the image are grouped together. The grouping may be done using correlation, seed growing, or segmentation technique. A calcium deposit may be spread in three-dimension and hence the images taken from different angles or planes may be different. Even if the selected calcium deposit is spread in a two dimensional plane, other calcium objects present in the image need not necessarily be in two-dimensional plane, but may have thickness as well. In other words, calcium deposits present in the image might be extended in the perpendicular direction as well. Each calcium deposit present in the image is identified along with their corresponding extensions in different planes. The groups could be saved in a memory. The group of objects could be processed together. For example, if the physician or radiologist wants to edit the calcium deposits present in the image, such as increasing the brightness or contrast, that could be preformed simultaneously to all the calcium deposits present in the image. Also all the selected objects may be annotated together.

At step 240, the physician or radiologist may focus on at least one of the grouped objects. For example, the physician may keep the mouse pointer or any other user interface device on any of the calcium deposits. In an embodiment, the selected object may be focused. At step 250, the group of objects belonging to the focused object is highlighted. Initially the group belonging to the focused object is identified. In an example, this is achieved by correlating the characteristics of the identified object with other objects present in the image. Thus the objects belonging to the selected object is identified and all the objects belonging to that group are highlighted. For example, if a computer mouse is focused on a calcium deposit displayed on a screen and is visible in one plane, the extension of calcium deposits in other planes are identified and highlighted. For example, an object or view of the object available in orthogonal plane is also highlighted upon focusing on the object viewed in axial, saggital or coronal plane. The extension in other planes could be highlighted separately or may be combined together to form a single three-dimensional view.

Figure 3:
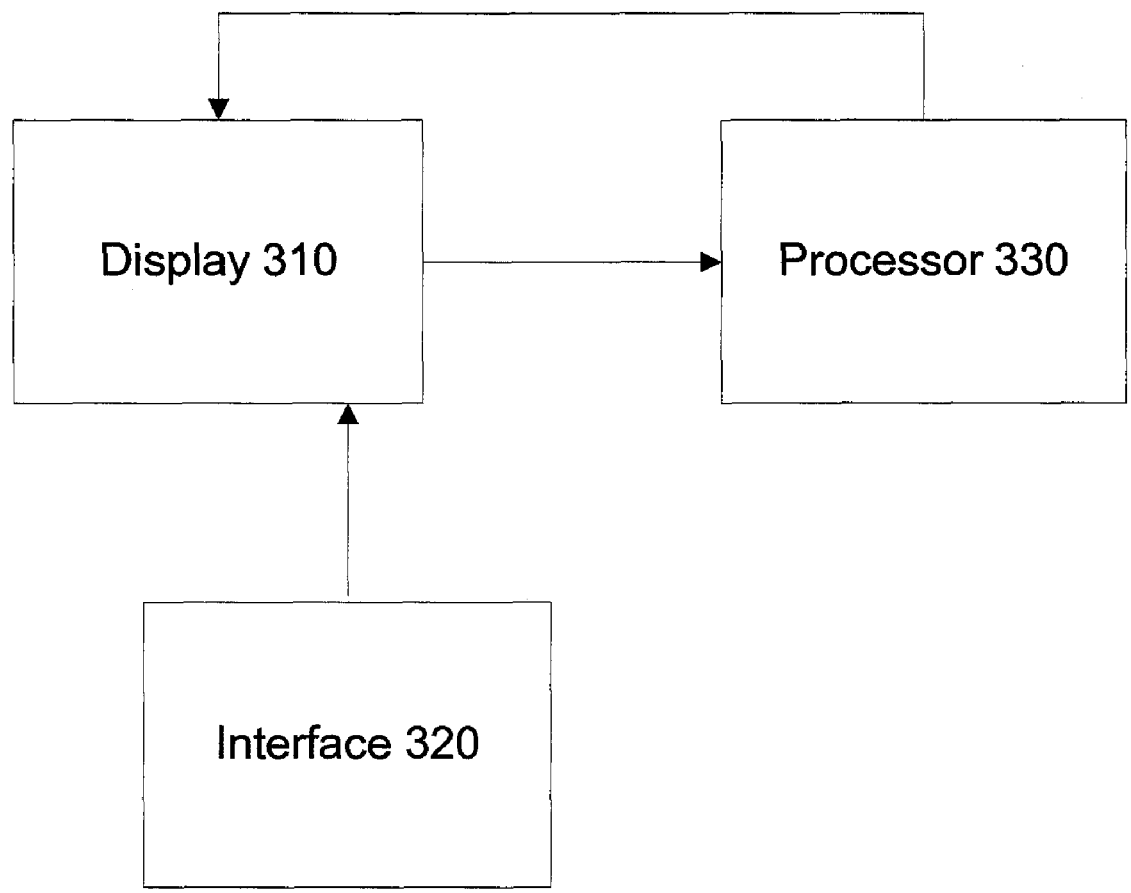
FIG. 3 is a block diagram of an electronic document display system as described in an embodiment of the invention.

FIG. 3 is a block diagram of an electronic document display system as described in an embodiment of the invention. The system is provided with a display 310 for displaying the electronic document. The display 310 might include any conventional electronic display unit such as a monitor, LCD screen, etc. A user interface 320 is provided in association with the display 310. The interface 320 is a user interface configured to assist the user in interacting with the display 310. The interface 320 may include various user interfaces such as a mouse, joystick, keypad or light pen, etc., but need not be limited to this. The display 310 is further associated with a processor 330 which is configured to process the displayed electronic document, based on the user inputs. In an example, the interface 320 is configured to select one or more objects from the document displayed on the display 310. Once the object is selected, the processor 330 detects the selection and identifies the characteristics of the selected object. The processor 330 is configured to identify other objects having similar characteristics present in the electronic document and to group them together. The processor 330 is further configured to access grouped objects upon focusing on any of the objects in that group.

In an example, the grouped objects may be highlighted or masked. The grouped objects may be processed simultaneously. In an example, the electronic document is a menu, and various objects in the menu are grouped and highlighted based on the functionality of the object. For example, in a menu there could be different icons performing different functions such as printing or saving operation. Once the user identifies a printing option, the processor 330 identifies the functionality of that icon and the icons that perform the same or similar functions or are closely associated with the functionality, groups them together, and highlights them. If the printing related icons are not grouped in a displayed menu, then upon focusing on an icon that is associated with the printing function, all the icons that are associated with printing functionality are grouped and highlighted.

The processor 330 is further associated with a memory 340 wherein the groups or group related information may be stored. In an example, the characteristics of the selected object may be saved, which could be used in the future. The processor 330 may also provide security to the object, image and selected group. For example, the accessibility of the grouped objects or image may be password protected.

For example, in the case of a medical image, the clinical or physical properties of the object specified may vary from the selected object. For example, the selected image may appear only in two-dimensions, but the objects that have similar properties may be extended in the perpendicular direction as well. Upon focusing on an object, the processor 330 is configured to identify and highlight the objects available in the image in the same plane along with the corresponding extension of objects in different planes. Different groups or highlighted objects may vary based on the characteristics of the object or requirement of the physician. Access to different groups may be protected using various available techniques including password protection.

Figure 4:
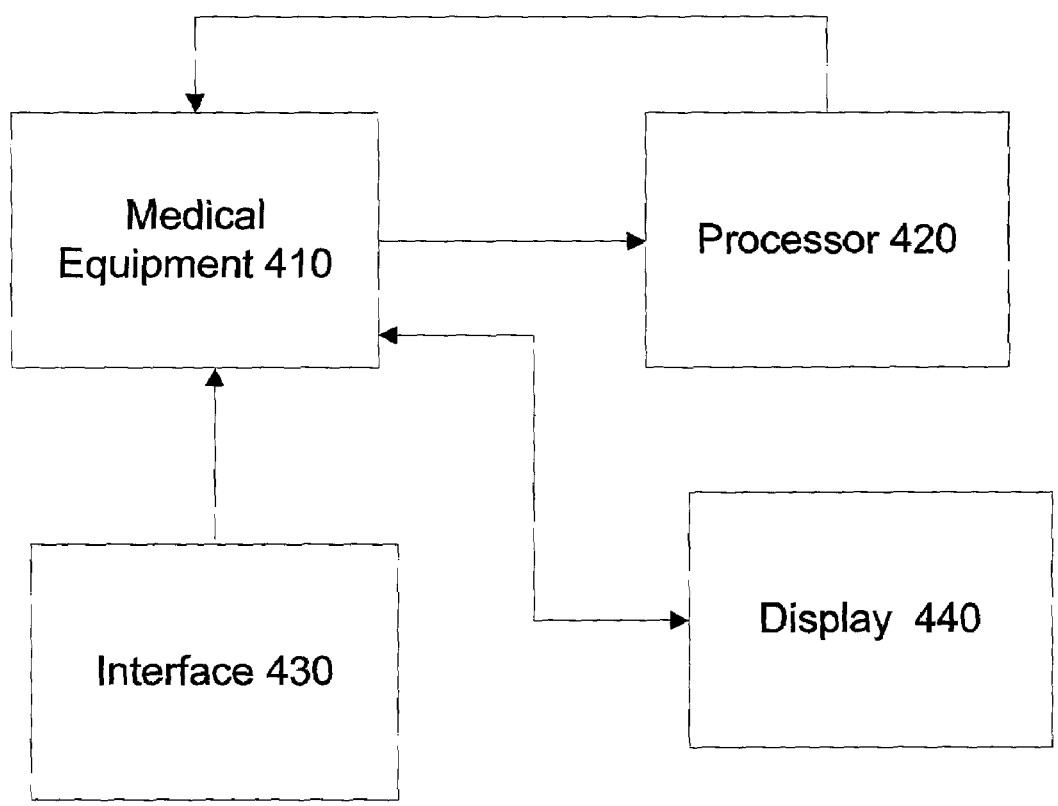
FIG. 4 is a block diagram of a clinical system as described in an embodiment of the invention.

FIG. 4 is a block diagram of a clinical system as described in an embodiment of the invention. The clinical system includes medical equipment 410 configured to capture images. The medical equipment could include any medical imaging devices, especially high-resolution medical imaging devices, surgical navigation systems, etc. A processor 420 is provided in association with the medical equipment 410 and is configured to automatically group a plurality of objects in a medical image based on their characteristics. In an embodiment, the characteristics based on which the objects in the image are grouped may include clinical or physical properties of the object in the image. Alternately some unique characteristics of the image may be specified, based on which the grouping may be achieved.

In an embodiment, the processor 420 is configured to identify the characteristics of an object selected by a physician. Alternately some characteristics may be specified to the processor 420. In an embodiment, the processor 420 may save the characteristics of the object that could be used later. Further the system is provided with a user interface 430 configured to facilitate interaction with the user. In an embodiment, through the user interface 430, the user may select a desired object or may specify the characteristics of the object. Further the user may access or focus on an object using the user interface 430, and then the user interface 430 in association with the processor 420 is configured to select the group to which the selected object belongs.

In an embodiment, the process of accessing or selecting the group of objects upon accessing or selecting one object from the group may be done by the user interface 430. The user interface 430 may be provided with a mechanism or instructions to perform the same or the user interface 430 may do it in association with the processor 420. Alternately the grouping and highlighting may be performed by the processor 420. A display 440 is provided for visually highlighting the group of objects. The processor 420 may group the objects visible in different planar views of the image. In an example, the extension of objects in different plane is identified. The extension is tagged with the corresponding object and are grouped them accordingly.

In an exemplary embodiment, the clinical system may include a surgical navigation system. In surgical navigation it is essential to track different clinical objects and surgical instruments. By specifying/identifying a part of the object or instrument, the object or instruments could be highlighted in the image. This improves the surgical navigation workflow.

In an exemplary embodiment, the system could be used for screening of objects, especially in security screening for patients with artificial metallic implants. By specifying the characteristics of the implants, relevant implants may be identified and highlighted.

In an exemplary embodiment, the clinical system may used to process various objects simultaneously. For example, in Computer Tomography, a metal artifact reduction scheme (MARS) algorithm is used to reduce artifacts induced by metal implants and objects inside the body. By identifying all such body, the correction scheme can be applied on all those similar objects, without the need for identifying each of them.

In an example, if the physician wants to mask a group of objects in an image, it could be done by selecting an object that need to be masked and masking all other objects by accessing the selected object. For example, while analyzing a blood vessel image physician may need to mask all the calcium deposits present in the blood vessel. This could be achieved by identifying all the calcium deposits and masking the same by focusing on a calcium deposit.

Figure 5A:
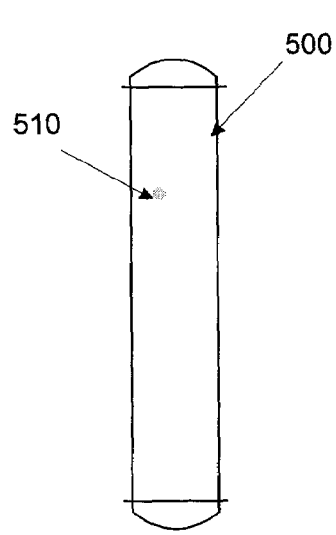
FIG. 5A to FIG. 5C show a diagrammatic representation of a method of highlighting a group of objects in an image as described in an embodiment of the invention.
Figure 5B:
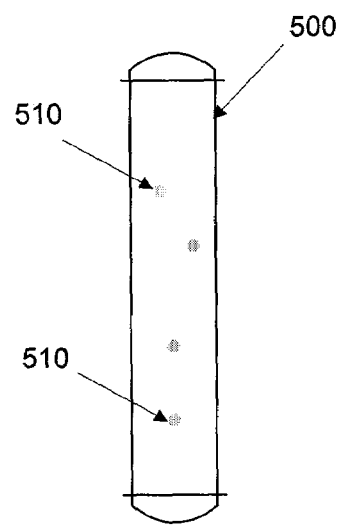
Figure 5C:
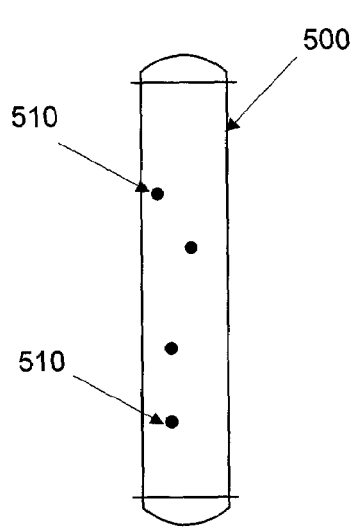

FIG. 5A to FIG. 5C show a diagrammatic representation of a method of highlighting a group of objects in an image as described in an embodiment of the invention. In FIG. 5A a blood vessel 500 is shown. The blood vessel 500 is present with calcium deposits 510 that need to be identified and highlighted. A physician identifies a calcium deposit 510 present in the blood vessel 500. Automatically, other calcium deposits 510 present in the blood vessel 500 are identified and are shown in FIG. 5B. Upon focusing on one of the calcium deposits 510, all the identified calcium deposits 510 are highlighted as shown in FIG. 5C.

Figure 6A:
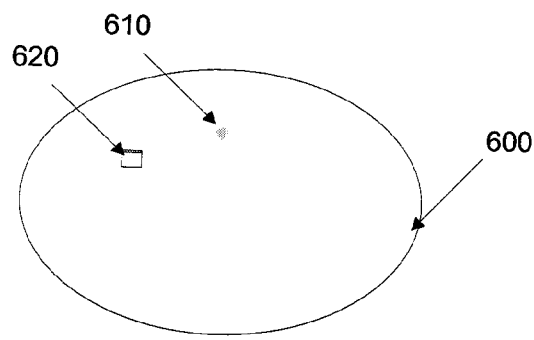
FIG. 6A to FIG. 6D show a diagrammatic representation of a method of highlighting different groups of objects in an image as described in an embodiment of the invention.
Figure 6B:
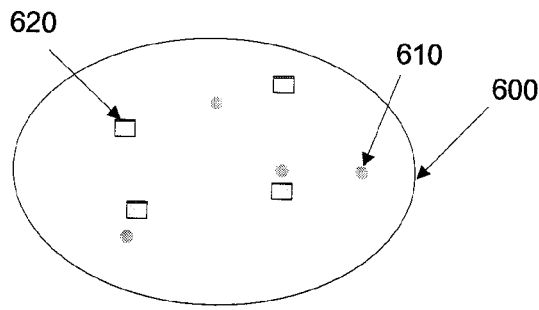
Figure 6C:
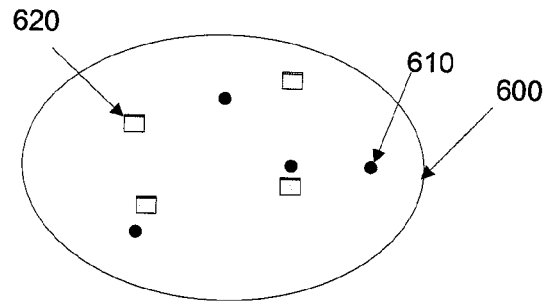
Figure 6D:
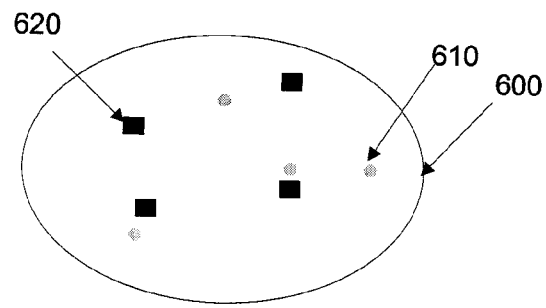

FIG. 6A to FIG. 6D show a diagrammatic representation of a method of highlighting different groups of objects in an image as described in an embodiment of the invention. In FIG. 6A to FIG. 6D a medical image 600 is shown. The image 600 shows a calcium deposit 610 and a fat deposit 620. A physician identifies the calcium deposit 610 and the fat deposit 620 in FIG. 6A. Various other calcium deposits 610 and fat deposits 620 are identified in the image 600, based on the characteristics of the identified calcium deposit 610 and fat deposit 620, as shown in FIG. 6B. In FIG. 6C, the physician focuses on one of the calcium deposits 610 and all the calcium deposits 610 present in the image 600 are highlighted. In FIG. 6D, the physician focuses on one of the fat deposits 620 and all the fat deposits 620 present in the image 600 are highlighted. In an exemplary embodiment, both calcium deposit 610 and fat deposit 620 may be highlighted simultaneously.

Figure 7A:
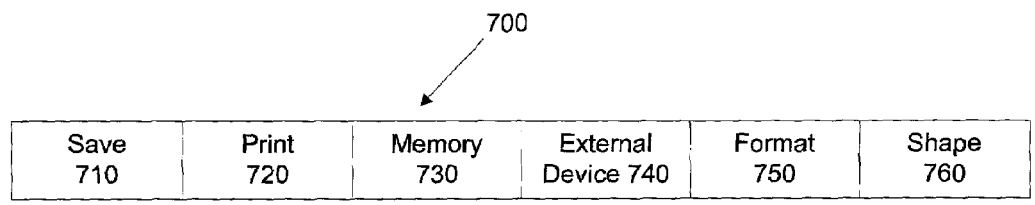
FIG. 7A to FIG. 7C show a diagrammatic representation of a method of highlighting a group of objects in a menu as described in an embodiment of the invention.
Figure 7B:
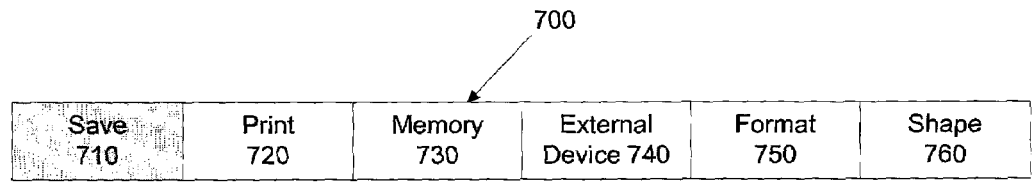
Figure 7C:
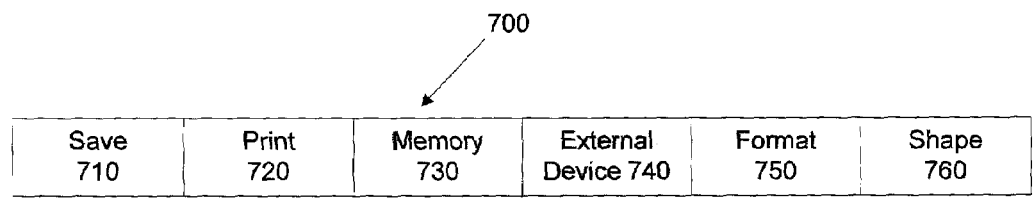

FIG. 7A to FIG. 7C show a diagrammatic representation of a method of highlighting a group of objects in a menu as described in an embodiment of the invention. FIG. 7A to FIG. 7C show a menu 700, wherein different icons represent a plurality of operations possible or functionality offered by the menu 700. Examples of the icons include, "Save icon 710", "Print icon 720", "Memory icon 730" enabling a user to save the data in a desired memory, "External device icon 740" enabling a user to save the data in an external device, "Format icon 750" and "Shape icon 760". A user may focus on the "Save icon 710", as illustrated in FIG. 7B. The functionally related icons are identified and grouped together. FIG. 7C shows the highlighted icons that are functionally related to the "Save icon 710". In this example, the icons highlighted are "Memory icon 730" and "External device icon 740" along with the "Save icon 710".

The advantages of the invention include improving workflow for evaluating documents including images and improving the productivity of imaging specialists. The invention helps in quick detection of several objects in an electronic document having similar characteristics.

The above-description of the embodiments of the methods and systems have the technical effect of highlighting a group of objects in an electronic document, upon focusing on any of the objects in the group.

The above-description of the embodiments of the methods and system has the technical effect of automatically grouping and accessing the objects in a group by accessing an object from the group. The method and system facilitates highlighting a group of objects upon focusing on one object from the group.

Thus various embodiments of the invention describe a method and system for highlighting objects in an electronic document. Another aspect of the invention is that the objects in a group are highlighted by focusing or assessing an object from the group.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Exemplary embodiments are described above in detail. The assemblies and methods are not limited to the specific embodiments described herein, but rather, components of each assembly and/or method may be utilized independently and separately from other components described herein. Further the steps involved in the workflow need not follow the sequence in which there are illustrated in figures and all the steps in the work flow need not be performed necessarily to complete the method.

While the invention has been described with reference to preferred embodiments, those skilled in the art will appreciate that certain substitutions, alterations and omissions may be made to the embodiments without departing from the spirit of the invention. Accordingly, the foregoing description is meant to be exemplary only, and should not limit the scope of the invention as set forth in the following claims.

I claim:

1. A method of highlighting objects in a medical image comprising:
   selecting at least one object in a medical image displayed in one plane, the object being a volumetric image;
   automatically identifying similar objects present in the image based on at least clinical characteristics of the selected object;
   grouping the identified similar objects as a group;
   focusing on an object in the group; and
   highlighting the objects in the group corresponding to the focused object, including extension of the objects in multiple planes.

2. A method as in claim 1, wherein the step of selecting includes: providing characteristics of the object.

3. A method as in claim 2, wherein the step of selecting further comprises: saving knowledge gained from the characteristics of the selected object.

4. A method as in claim 1, wherein the object includes an intravascular calcium deposit, an inter-vascular calcium deposit, a blood vessel block, a tumor or cancer growth.

5. A method as in claim 1, wherein the step of automatically identifying similar objects comprises: identifying the clinical characteristics of the selected object.

6. A method as in claim 1, wherein the step of highlighting comprises: highlighting the object in orthogonal plane along with the object in a selected plane, upon focusing on the object in axial, coronal or sagittal plane.

7. A method as in claim 1, further comprising: displaying the objects in different planes separately or combined together.

8. A system for displaying medical images comprising:
   a display configured to display a medical image;
   an interface configured to assist in selecting an object in the medical image, the object being displaced in one plane, the object being a volumetric image; and
   a processor for grouping objects in the electronic document based on the characteristics of the selected object; and
   wherein the processor is further configured to highlight the objects in a group including extension of objects in different planes upon focusing on one object in the group using the interface.

9. A system as in claim 8, further comprising a memory configured to store the grouped objects.

10. A system as in claim 8, wherein the processor is further configured to automatically identify objects having similar characteristics of the selected object.

11. A computer-readable media having one or more computer readable medium, each of the one or more computer readable medium including executable program instructions which, when executed by a processor, cause the process to implement a method for displaying an object comprising:
   a routine for selecting at least one object in a medical image displayed in one plane, the object being a volumetric image;
   a routine for grouping objects in the medical image based on characteristics of the at least one selected object;
   a routine for accessing the group of objects by focusing on an object in the group; and
   a routine for highlighting the objects in the group corresponding to the focused object, including extension of the objects in multiple planes.

12. A clinical system comprising:
   a medical equipment configured to capture medical images;
   a processor associated with the medical equipment configured to automatically group a plurality of objects in a medical image based on their characteristics;
   a user interface configured to select a group by focusing an object in the group, the object being a volumetric image; and
   a display for visually highlighting the group of objects having similar characteristics along with extension of the objects in multiple planes.

13. A system as in claim 12, wherein the system includes any high resolution imaging devices or surgical navigation system.

* * * * *